United States Patent
Matsumoto et al.

(10) Patent No.: US 12,549,668 B2
(45) Date of Patent: Feb. 10, 2026

(54) METHOD AND SYSTEM TO PRE-DIAGNOSE AN ISSUE AND PROVIDE PERSONALIZED IVR SOLUTION

(71) Applicant: RAKUTEN MOBILE, INC., Tokyo (JP)

(72) Inventors: Rinka Matsumoto, Tokyo (JP); Rina Takamatsu, Tokyo (JP); Anshul Bhatt, San Mateo, CA (US)

(73) Assignee: RAKUTEN MOBILE, INC., Tokyo (JP)

( * ) Notice: Subject to any disclaimer, the term of this patent is extended or adjusted under 35 U.S.C. 154(b) by 917 days.

(21) Appl. No.: 17/783,733

(22) PCT Filed: Mar. 25, 2022

(86) PCT No.: PCT/US2022/021886
§ 371 (c)(1),
(2) Date: Sep. 28, 2023

(87) PCT Pub. No.: WO2023/183003
PCT Pub. Date: Sep. 28, 2023

(65) Prior Publication Data
US 2024/0187520 A1 Jun. 6, 2024

(51) Int. Cl.
*H04M 3/493* (2006.01)
*H04M 3/42* (2006.01)
(52) U.S. Cl.
CPC ..... *H04M 3/4936* (2013.01); *H04M 3/42348* (2013.01)
(58) Field of Classification Search
CPC .. H04M 3/4936; H04M 3/42348; H04M 3/30; H04M 3/4228; H04W 4/16; H04W 84/042; H04W 4/90; H04W 12/08; H04W 76/50; H04W 12/69; H04W 12/069; H04W 12/72; H04W 4/02; H04W 4/029; H04W 76/18; H04W 76/10; H04W 84/18
See application file for complete search history.

(56) References Cited

U.S. PATENT DOCUMENTS

| | | | |
|---|---|---|---|
| 7,412,260 B2 * | 8/2008 | Gailey | G06F 16/24522 704/251 |
| 10,447,860 B1 * | 10/2019 | Hartman | H04M 7/006 |

(Continued)

OTHER PUBLICATIONS

International Search Report dated Jun. 21, 2022 issued by the International Searching Authority in Application No. PCT/US2022/21886.

(Continued)

*Primary Examiner* — Akelaw Teshale
(74) *Attorney, Agent, or Firm* — Sughrue Mion, PLLC

(57) ABSTRACT

A method for providing an interactive voice response is provided. The method includes receiving an inquiry from an electronic device, determining a geolocation of the electronic device, determining whether the geolocation of the electronic device corresponds to disruption information stored on a database, retrieving the disruption information based on determining that the geolocation of the electronic device corresponds to the disruption information, generating an interactive voice response (IVR) based on the retrieved disruption information, and providing the IVR to the electronic device.

20 Claims, 5 Drawing Sheets

(56) References Cited

U.S. PATENT DOCUMENTS

| | | | |
|---|---|---|---|
| 2006/0046740 A1* | 3/2006 | Johnson | H04W 4/02 455/456.1 |
| 2006/0140375 A1* | 6/2006 | Paden | H04M 3/50 379/210.01 |
| 2018/0007203 A1* | 1/2018 | Batlle | H04M 3/4217 |

OTHER PUBLICATIONS

Written Opinion dated Jun. 21, 2022 issued by the International Searching Authority in Application No. PCT/US2022/21886.

* cited by examiner

METHOD AND SYSTEM TO PRE-DIAGNOSE AN ISSUE AND PROVIDE PERSONALIZED IVR SOLUTION

BACKGROUND

1. Field

The disclosure relates to a system and method for pre-diagnosing customer issues and providing personalized interactive voice responses (IVRs).

2. Description of Related Art

When receiving a user inquiry (e.g., customer calls) regarding an issue, a typical system, by either automation or person-to-person interaction, will engage with the user through back and forth interaction to diagnose the issue. The existing procedure is time consuming, and as more user inquiries enter the system, wait times for users significantly increase.

SUMMARY

In accordance with an aspect of the disclosure, a method may include receiving an inquiry from an electronic device, determining a geolocation of the electronic device, determining whether the geolocation of the electronic device corresponds to disruption information stored on a database, retrieving the disruption information based on determining that the geolocation of the electronic device corresponds to the disruption information, generating an interactive voice response (IVR) based on the retrieved disruption information, and providing the IVR to the electronic device.

In accordance with an aspect of the disclosure, a system may include a memory storing instructions and a processor configured to execute the instructions to receive an inquiry from an electronic device, determine a geolocation of the electronic device, determine whether the geolocation of the electronic device corresponds to disruption information stored on a database, retrieve the disruption information based on determining that the geolocation of the electronic device corresponds to the disruption information, generate an IVR based on the retrieved disruption information, and provide the IVR to the electronic device.

In accordance with an aspect of the disclosure, a non-transitory, computer-readable storage medium may store instructions that, when executed, cause one or more processors to receive an inquiry from an electronic device, determine a geolocation of the electronic device, determine whether the geolocation of the electronic device corresponds to disruption information stored on a database, retrieve the disruption information based on determining that the geolocation of the electronic device corresponds to the disruption information, generate an IVR based on the retrieved disruption information, and provide the IVR to the electronic device.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
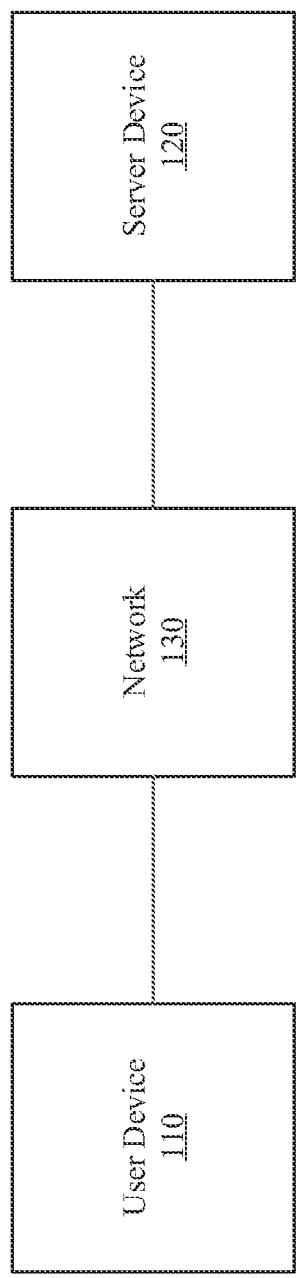
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
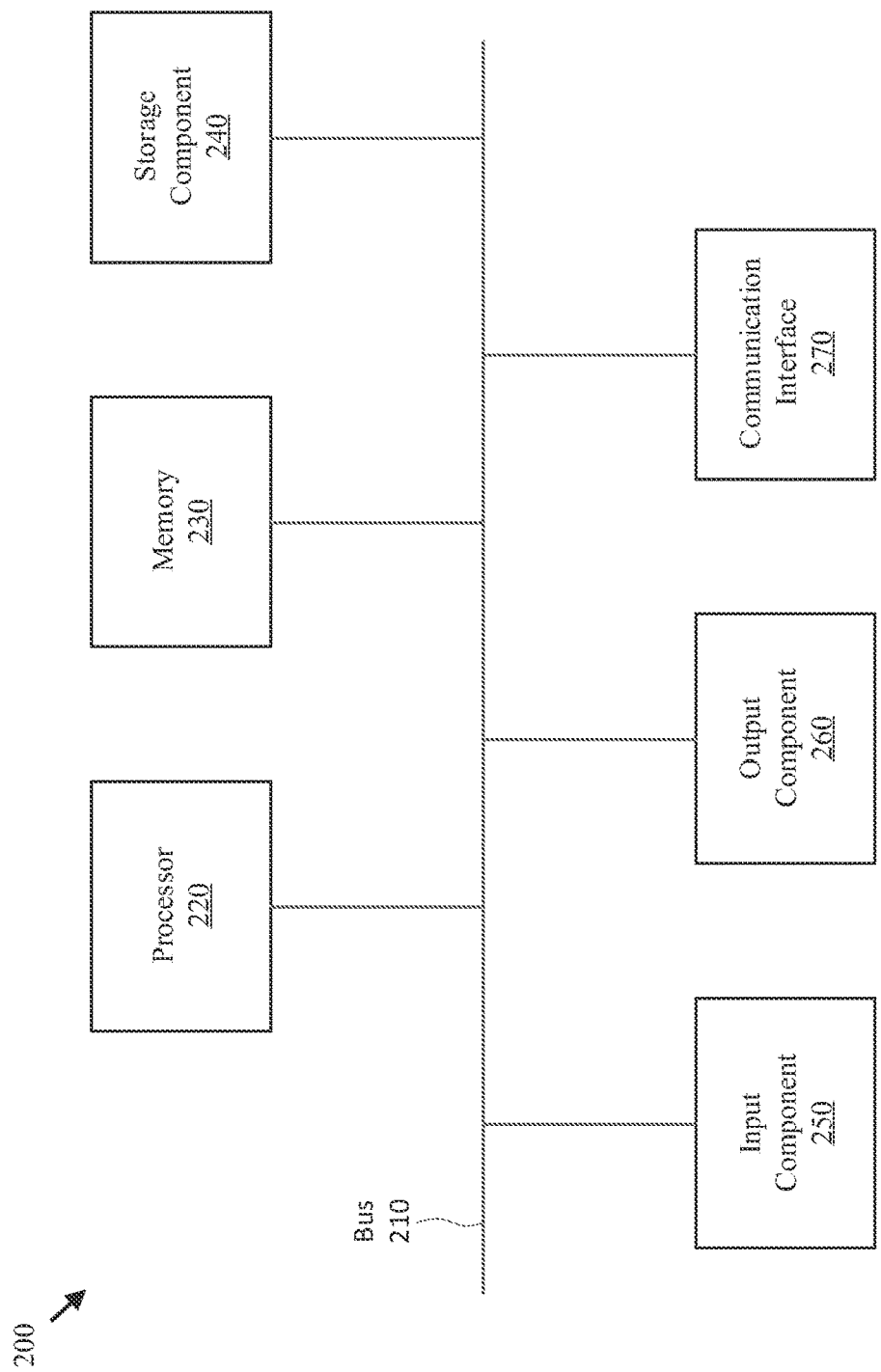
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided herein are a system and method for pre-diagnosing a customer issue (e.g., a reason for a customer call) and providing an interactive voice response (IVR) based on the pre-diagnosed customer issue. The provided system and method may also provide IVR recommendations to the user while the user is waiting in line for a call response. The provided system and method may detect a customer's voice, convert the detected voice into text, and apply pre-defined rules to generate an IVR. The provided system and method may provide an engine that may give an option to the customer to clearly state the problems and the help that is requested prior to reaching a customer care representative. Thus, the provided system and method may answer the inquiry of the customer by auto-detection (e.g., based on pre-defined rules).

In some embodiments, the system may determine a user's geolocation based on user identifiers (e.g. but not limited to, international mobile subscriber identity (IMSI), mobile station integrated services digital network (MSISDN), global positioning system (GPS) information, etc.) and provide personalized IVR options based on the geolocation. The system may retrieve or identify incident, disruption, and maintenance information from corresponding databases based on a selection of the personalized IVR options (e.g., when the user selects an option regarding a network issue). When the incident, disruption or maintenance information corresponds to the geolocation of the customer, the system may provide an IVR to the user that informs the user of a network issue corresponding to the geolocation of the user (e.g., network outages, maintenance, estimated time to repair, etc.). The IVR may be provided to the user while the user is waiting in line to reach a customer service agent. Furthermore, if the user has abandoned the call or dropped the call while waiting to reach the customer service agent, the system may be configured to automatically call back the user once a customer service agent is available.

In some embodiments, the system is configured to detect a voice of a user, and convert the voice of the user into text. The system may provide personalized IVR options, including a pre-diagnosis option, in accordance with auto-configured logic based on predefined conditions, such as an inquiry category selection, a frequency of inquiry logic, a network in the geolocation of the user, a site in the geolocation of the user, disaster conditions in the geolocation of the user, etc. For example, when a customer calls and is present at a location where a tower or site is down, the system may be configured to inform (e.g., automatically inform) the user of the issue. Furthermore, in another example, if an inquiry category is set to "Network," the system may provide the user with options, such as checking network information for the location, and if an inquiry category is set to "Order," the system may provide the user with options such as checking status of an order, status of a delivery, etc. The system may provide additional IVR options. For example, the system may determine that the user currently has a pending SIM (Subscriber Identity Module) order and is awaiting delivery, and the system may provide an estimated delivery date of the SIM order to the user while the user is waiting for a customer service agent.

The system and method disclosed herein provide user information for an IVR system and pre-diagnose user issues before the user reaches a customer service agent, reducing the number of calls and call center operation costs.

Figure 3:
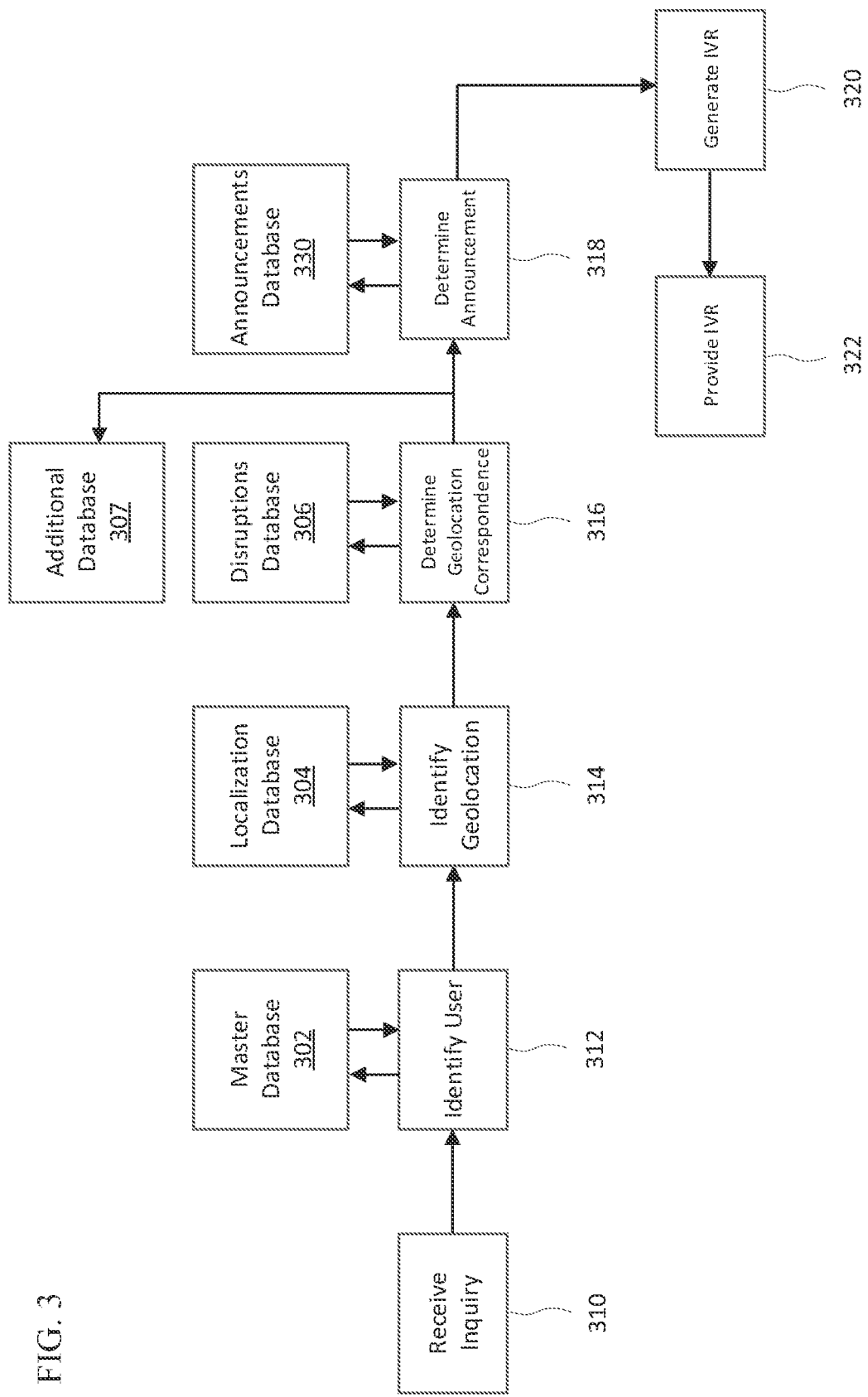
FIG. 3 is a diagram of a system for generating an interactive voice response (IVR), according to an embodiment.

FIG. 3 is a diagram of a system for generating an IVR, according to an embodiment. The system includes a master database 302 configured to store information/data on users, such as ISMI, MSISDN, phone numbers, locations, etc., a localization database 304 configured to store localization information/data for inferring locations based on user inputs (e.g., the localization database may be used to identify potential zip codes from inputs of partial zip codes), and a disruptions database 306 configured to store information/data on service incidents, disruptions, and maintenance (e.g., disruption location, disruption time, estimated time to repair, etc.). Although the disruptions database 306 is shown as a single database, the system may include an individual database to separate disruptions, incidents, and maintenance events. The system may also include an additional database 307 that stores other information about the user or the electronic device (e.g., a delivery status for product order the user place, remaining minutes on a call plan, remaining data on a data plan, etc.). Although FIG. 3 depicts the additional database 307 being accessed after the disruptions database 306 is accessed, the system may access the additional database 307 at any point in the operation.

In operation 310, the system receives an inquiry from an electronic device (e.g., a call from a user of the electronic device, a text message from a user of the electronic device). The inquiry may be a request to contact a customer service agent of an operations center corresponding to the network/service provided to the electronic device. Based on the inquiry, in operation 312, the system identifies a user of the electronic device (e.g., the system identifies a user account associated with the user) based on an ISMI, MSISDN, phone number, etc., of the electronic devices and on the information/data in the master database 302. In operation 314, the system determines a geolocation of the electronic device. The system may determine the geolocation of the electronic device based on an input zip code from a user of the electronic device as well as the data/information in the localization database 304. In operation 316, the system determines whether the geolocation of the electronic device corresponds to the disruption data/information in the disruptions database 306 (i.e., the system determines whether a location of a disruption, incident, or maintenance corresponds to the geolocation of the electronic device).

In operation 318, the system determines an announcement to provide to the electronic device based on determination of whether the geolocation corresponds to disruption data/information. For example, if the geolocation of the electronic device corresponds to an incident stored in the disruptions database 306, the system selects an announcement that include information on the incident as well as an expected recovery time for the incident. The announcement may be predefined and stored in an announcements database 330 (e.g., the announcements may be preconfigured in a list of available announcements, and the system may select the appropriate predefined announcement based on the result of operation 316) and/or may be dynamically generated based on the result of operation 316. In operation 320, the system generates an IVR based on the selected announcement. In operation 322, the system provides the IVR to the electronic device. In some embodiments, the inquiry is directed to other information besides disruptions, such as a delivery status of a placed order. In such embodiments, the system may utilize database 307 to produce a corresponding announcement regarding the inquiry on other information besides disruptions.

Figure 4:
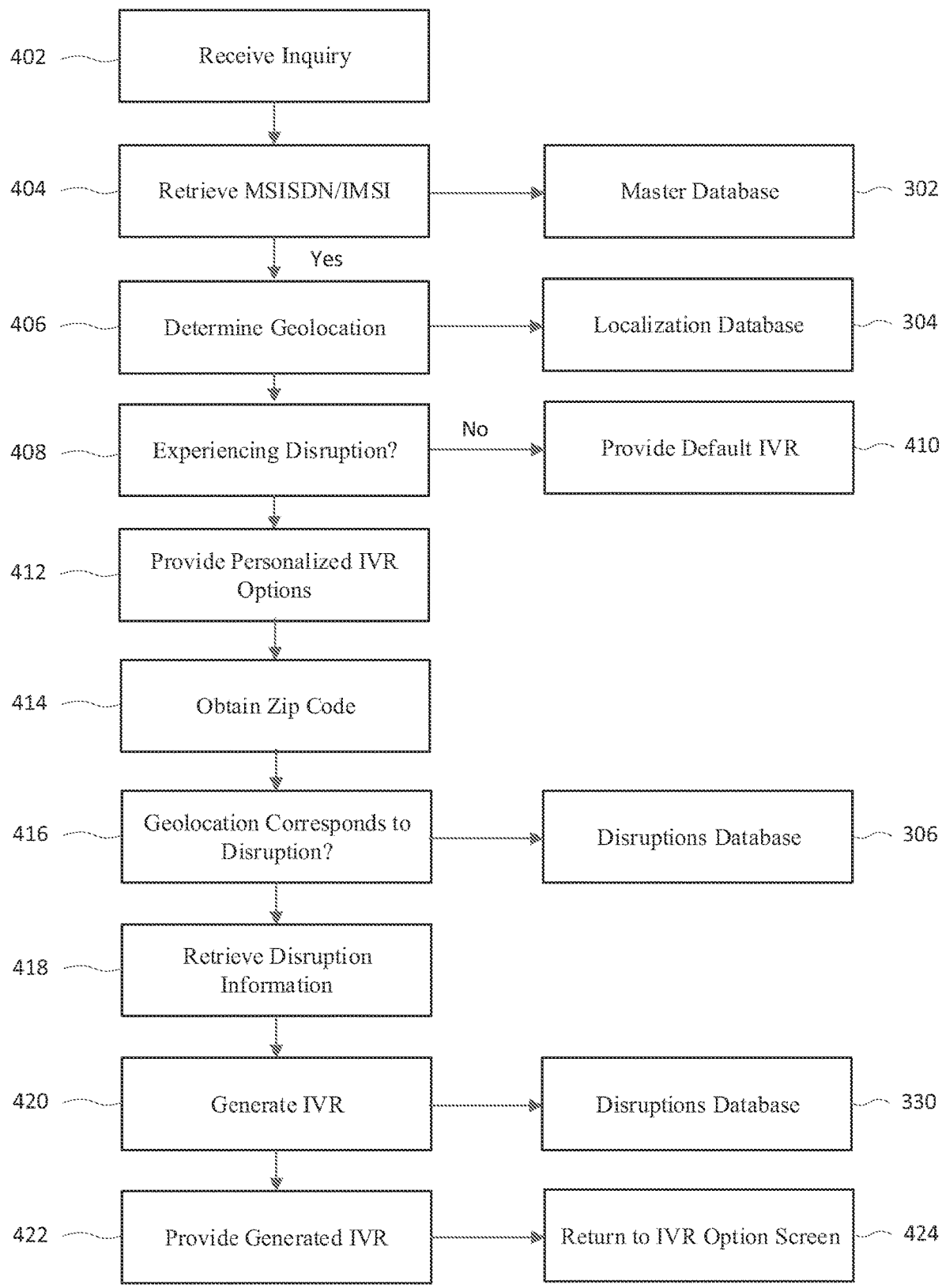
FIG. 4 is a flowchart of a method for generating an IVR, according to an embodiment.

FIG. 4 is a flowchart of a method for generating an IVR, according to an embodiment. In operation 402, the system receives an inquiry from an electronic device (e.g., a call or text message from a user of the electronic device). In operation 404, the system retrieves the MSISDN and/or the IMSI of the electronic device using, for example, the master database (e.g., the master database 302). In operation 406, the system determines a geolocation of the electronic device using, for example, the localization database (e.g., the localization database 304). In operation 408, the system inquires the user of the electronic device whether the user is having a disruption (e.g., a service disruption/incident). Based on the user indicating that no disruption is occurring, in operation 410, the system provides default IVR options to the electronic device (e.g., non-disruption related options).

Based on the user indicating that a disruption is occurring, in operation 412, the system provides personalized IVR options, including an option for pre-diagnosing the disruption issue. Based on the user selecting the option to pre-diagnose the disruption issue, in operation 414, the system obtains the zip code of the user (e.g., based on network parameters and other factors, the system may manually request the location of the user of the electronic device, or further request permission from the user to use obtained location information to pre-diagnose the disruption issue). In operation 416, the system determines whether the location information of the user (e.g., the geolocation of the user and/or the zip code of the user) corresponds to disruption information stored in a disruption database (e.g., disruptions database 306). In operation 418, the system retrieves the disruption information based on determining that the location information of the user (e.g., location of the electronic device) corresponds to the disruption information.

In operation 420, the system generates an IVR based on the retrieved disruption information. The system may generate the IVR by selecting an announcement from among a plurality of predetermined announcements (e.g., stored in announcements database 330) and configuring the selected announcement with information specific to the disruption information (e.g., the announcement may include the number of disruptions, an expected repair time, etc.). Alternatively, when the system determines that there is no disruption information corresponding to the geolocation of the electronic device, the system may generate an IVR to indicate that there are no disruptions reported in an area corresponding to the geolocation of the electronic device. In operation 422, the system provides the generated IVR to the electronic device. In operation 424, the system may return the electronic device to the IVR option selection screen.

Figure 5:
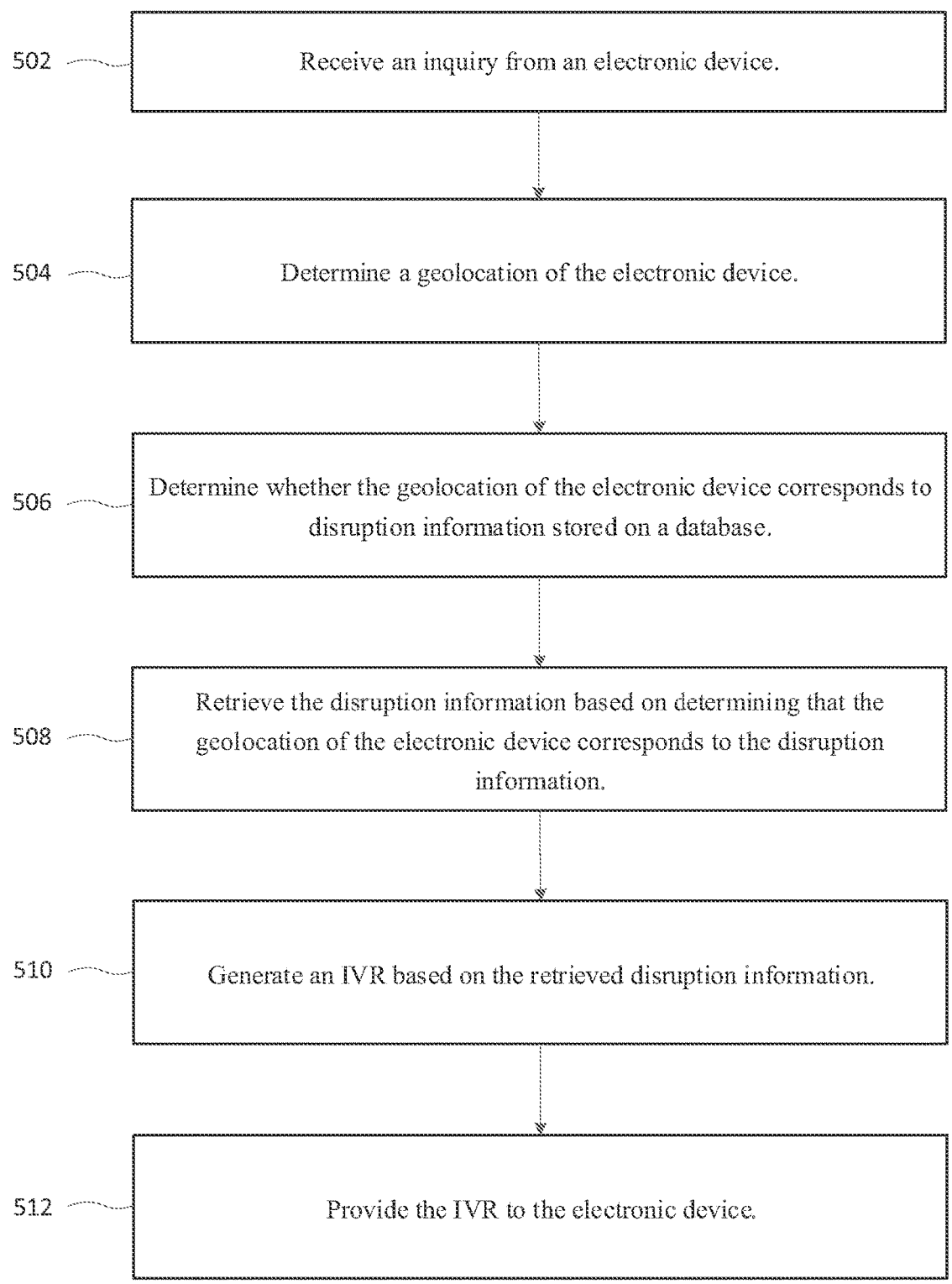
FIG. 5 is a flowchart of a method for generating an IVR, according to an embodiment.

FIG. 5 is a flowchart of a method for generating an IVR, according to an embodiment. In operation 502, the system receives an inquiry from an electronic device. In operation 504, the system determines a geolocation of the electronic device. In operation 506, the system determines whether the geolocation of the electronic device corresponds to disruption information stored on a database. In operation 508, the system retrieves the disruption information based on determining that the geolocation of the electronic device corresponds to the disruption information. In operation 510, the system generates an IVR based on the retrieved disruption information. In operation 512, the system provides the IVR to the electronic device.

The foregoing disclosure provides illustration and description, but is not intended to be exhaustive or to limit the implementations to the precise form disclosed. Modifications and variations are possible in light of the above disclosure or may be acquired from practice of the implementations. By maintaining and updating databases of disruptions, announcements, and other information as is described above, the overall user experience can be improved as the user may receive up to date and accurate information regarding their inquiries with little delay. Furthermore, the system for providing IVR as disclosed herein also reduces the number of inquiries a call center or other centralized location may receive from users regarding network status, order status, etc., thereby freeing up resources of the call center or centralized locations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing an interactive voice response, the method comprising:
   receiving an inquiry from an electronic device, the inquiry being with respect to a mobile telecommunications network;
   determining a category of the inquiry from among a plurality of predetermined categories, the category being determined based on a user of the electronic device indicating the category; and
   based on determining that the category of the inquiry is a service disruption of the mobile telecommunications network:
      determining a geolocation of the electronic device;
      determining whether the geolocation of the electronic device corresponds to disruption information stored on a database;
      retrieving the disruption information based on determining that the geolocation of the electronic device corresponds to the disruption information;
      generating an interactive voice response (IVR) based on the retrieved disruption information; and
      providing the IVR to the electronic device.

2. The method of claim 1, wherein determining the geolocation of the electronic device comprises at least one of:
   retrieving location data from the electronic device; or
   receiving location information input to the electronic device by the user of the electronic device.

3. The method of claim 1, wherein the retrieved disruption information comprises incident information corresponding to the determined geolocation or maintenance information corresponding to the determined geolocation.

4. The method of claim 1, further comprising, based on the category of the inquiry being a customer order, determining an order status of the user, generating another IVR based on the determined order status, and providing the other IVR to the electronic device,
   wherein the plurality of predetermined categories comprises the service disruption and the customer order.

5. The method of claim 1, further comprising determining an identity of the electronic device after receiving the inquiry from the electronic device.

6. The method of claim 1, wherein the determining the category comprises inquiring the user of the electronic device as to whether the user is experiencing a service disruption.

7. The method of claim 6, further comprising, based on the user indicating that the user is experiencing a service disruption, providing at least one IVR option to the electronic device for pre-diagnosing the service disruption.

8. A system for providing an interactive voice response, the system comprising:
   a memory storing instructions; and
   a processor configured to execute the instructions to:
      receive an inquiry from an electronic device, the inquiry being with respect to a mobile telecommunications network;
      determine a category of the inquiry from among a plurality of predetermined categories, the category being determined based on a user of the electronic device indicating the category; and
      based on determining that the category of the inquiry is a service disruption of the mobile telecommunications network:
         determine a geolocation of the electronic device;
         determine whether the geolocation of the electronic device corresponds to disruption information stored on a database;
         retrieve the disruption information based on determining that the geolocation of the electronic device corresponds to the disruption information;
         generate an interactive voice response (IVR) based on the retrieved disruption information; and
         provide the IVR to the electronic device.

9. The system of claim 8, wherein the processor is configured to execute the instructions to determine the geolocation of the electronic device by at least one of:
   retrieving location data from the electronic device; or
   receiving location information input to the electronic device by the user of the electronic device.

10. The system of claim 8, wherein the retrieved disruption information comprises incident information corresponding to the determined geolocation or maintenance information corresponding to the determined geolocation.

11. The system of claim 8, wherein the IVR includes an announcement generated based on the disruption information.

12. The system of claim 8, wherein the processor is further configured to execute the instructions to determine an identity of the electronic device after receiving the inquiry from the electronic device.

13. The system of claim 8, wherein the processor is further configured to execute the instructions to inquire the user of the electronic device as to whether the user is experiencing a service disruption.

14. The system of claim 13, wherein the processor is further configured to execute the instructions to, based on the user indicating that the user is experiencing a service disruption, provide at least one IVR option to the electronic device for pre-diagnosing the service disruption.

15. A non-transitory computer-readable storage medium storing instructions for providing an interactive voice response that, when executed, cause one or more processors to:
   receive an inquiry from an electronic device, the inquiry being with respect to a mobile telecommunications network;
   determine a category of the inquiry from among a plurality of predetermined categories, the category being determined based on a user of the electronic device indicating the category; and
   based on determining that the category of the inquiry is a service disruption of the mobile telecommunications network:
      determine a geolocation of the electronic device;
      determine whether the geolocation of the electronic device corresponds to disruption information stored on a database;
      retrieve the disruption information based on determining that the geolocation of the electronic device corresponds to the disruption information;
      generate an interactive voice response (IVR) based on the retrieved disruption information; and
      provide the IVR to the electronic device.

16. The storage medium of claim 15, wherein the instructions, when executed, further cause the one or more processors to determine the geolocation of the electronic device by at least one of:
   retrieving location data from the electronic device; or
   receiving location information input to the electronic device by the user of the electronic device.

17. The storage medium of claim 15, wherein the retrieved disruption information comprises incident information corresponding to the determined geolocation or maintenance information corresponding to the determined geolocation.

18. The storage medium of claim 15, wherein the IVR includes an announcement generated based on the disruption information.

19. The storage medium of claim 15, wherein the instructions, when executed, further cause the one or more processors to determine an identity of the electronic device after receiving the inquiry from the electronic device.

20. The storage medium of claim 15, wherein the instructions, when executed, further cause the one or more processors to inquire the user of the electronic device as to whether the user is experiencing a service disruption.

* * * * *